US008149415B2

(12) United States Patent
Sanders et al.

(10) Patent No.: US 8,149,415 B2
(45) Date of Patent: Apr. 3, 2012

(54) BACKGROUND-FREE ABSORPTION SPECTROSCOPY USING SPECTRAL DIFFERENTIATOR

(75) Inventors: Scott Thomas Sanders, Madison, WI (US); Thilo Kraetschmer, Spraitbach (DE)

(73) Assignee: Wisconsin Alumni Research Foundation, Madison, WI (US)

( * ) Notice: Subject to any disclaimer, the term of this patent is extended or adjusted under 35 U.S.C. 154(b) by 254 days.

(21) Appl. No.: 12/699,332

(22) Filed: Feb. 3, 2010

(65) Prior Publication Data

US 2011/0188046 A1    Aug. 4, 2011

(51) Int. Cl.
  *G01B 9/02* (2006.01)
  *G01J 3/45* (2006.01)
(52) U.S. Cl. .................................................. 356/451
(58) Field of Classification Search ............ 356/451, 356/456
  See application file for complete search history.

(56) References Cited

U.S. PATENT DOCUMENTS

| 5,572,125 | A  | * | 11/1996 | Dunkel | 324/307 |
| 7,342,229 | B1 | * | 3/2008  | Reiss  | 250/339.13 |
| 2011/0188046 | A1 | * | 8/2011 | Sanders et al. | 356/451 |

OTHER PUBLICATIONS

Kluczynski, Paul et al., Theoretical Description Based on Fourier Analysis of Wavelength-modulation Spectrometry in Terms of Analytical and Background Signals, pp. 5803-5815, vol. 38, No. 27, Sep. 20, 1999, Applied Optics, Optical Society of America, Washington, DC, USA.

* cited by examiner

*Primary Examiner* — Patrick J Connolly
(74) *Attorney, Agent, or Firm* — Boyle Fredrickson, S.C.

(57) ABSTRACT

An absorption spectrometer provides improved rejection of background radiation signal by employing a frequency-swept laser signal without frequency dithering and performing an effective differentiation of output light from a test cell to eliminate these constant or slowly varying background radiation levels.

20 Claims, 3 Drawing Sheets

BACKGROUND-FREE ABSORPTION SPECTROSCOPY USING SPECTRAL DIFFERENTIATOR

STATEMENT REGARDING FEDERALLY SPONSORED RESEARCH OR DEVELOPMENT

This invention was made with United States government support awarded by the following agencies: USAF/AFOSR FA8650-08-C-2856

The United States government has certain rights in this invention.

BACKGROUND OF THE INVENTION

The present invention relates to absorption spectroscopy systems and in particular to an absorption spectroscopy system having improved background light rejection.

Absorption spectroscopy is a tool of chemical analysis that measures light absorption by a material being investigated over a range of different frequencies. In laser absorption spectroscopy, a laser may be directed through the material, for example a gas within a test cell, while the laser frequency is tuned over the absorption range of the sample in a "sweep" of frequencies. The amplitudes of light before and after it passes through the material are compared to produce an absorption spectrum.

A practical problem in measuring absorption spectra using this technique is that the light detector receiving light from the test cell must be able to discriminate small intensity variations caused by absorption in the presence of the a strong "background" signal from the laser from the un-absorbed laser light striking the light detector.

Background laser signal may be suppressed to some extent through the use of modulation techniques such as "wavelength-modulation spectroscopy" (WMS) or "frequency-modulation spectroscopy" (FMS). In both techniques, the wavelength or frequency of the laser is "dithered" as it is swept through a range of frequencies, the dithering being a slight frequency modulation on top of monotonic modulation of the frequency sweep. Dithering serves to frequency encode the absorption bands in the material as a result of interaction of wavelength dithering with the absorption feature. This frequency encoded absorption signal may be de-modulated to eliminate the substantially unmodulated background radiation.

While this approach can greatly reduce the influence of background radiation, there are practical difficulties. For example, when a tunable diode laser used as the light source and the dithering is implemented by changing the injection current of the diode, a relatively small frequency range of dithering is possible; a range that may be much smaller than the absorption feature. Further, not all laser sources (for example, some lasers that may have desired frequencies for particular absorption features) permit injection current modulation or make the injection current accessible. Controlling the dithering through injection current control can be complex and it can be difficult to control the dithering in a stable manner or to manage incidental amplitude modulation that can obscure the desired signal.

SUMMARY OF THE INVENTION

The present invention provides a technique for reducing the effect of background radiation in absorption spectroscopy that works with undithered light sources. In this way, limitations on modulation depth can be overcome, the need for and complexity of injection current control is eliminated and the difficulty of managing amplitude modulation associated with such dithering reduced or eliminated. In the invention, background radiation is canceled by performing a local subtraction or differentiation of the light spectrum either with respect to time (when the light source is swept in frequency) or with respect to space (in a conventional rectilinear spectrum).

One embodiment of the present invention provides an absorption spectrometer having a test cell, or its functional equivalent, for holding a material for spectrographic analysis and a multi-frequency light source producing a monotonically swept frequency spanning a frequency range of a desired absorption spectrum. A splitter/delay system splits light of the multi-frequency light source into a first and second path wherein the light is delayed in the first path with respect to the second path and an analyzer receives output light from the multi-frequency light source after passage through both the test cell and the first and second path to provide an electrical signal substantially reducing a measure of background radiation from the multi-frequency light source unattenuated by the material. In one embodiment, the electrical signal may be substantially a differencing of intensity values of the output light at different adjacent spectral frequencies over successive spectral frequencies. A reconstructor then receives the electrical signal to reconstruct the absorption spectrum of the material.

It is thus a feature of at least one embodiment of the invention to obtain the advantages of being able to use a slowly swept light source in sensitive absorption spectroscopy. The differentiation of the intensity values eliminates the contribution of constant background radiation which either does not change between samples or changes so slowly as to be negligible.

The analyzer may be a balanced photodetector receiving light from the first and second light path at different ports of the balanced photodetector, the balanced photodetector taking a difference of the light at the different ports to produce the electrical signal.

It is thus a feature of at least one embodiment of the invention to provide a method of subtracting signals that is robust against drift or calibration differences and that avoids quantization errors inherent in performing, such as subtraction in a digital domain within a computer.

In one embodiment, the analyzer may include a photodetector and an optical switch may apply pulses of the light from the multi-frequency light source to the first and second light path so that light from the multi-frequency light source is received at a single photodetector after two different delay times providing, at alternating times, light at different adjacent spectral frequencies. In this case, the analyzer may further include a demodulator receiving the electrical signal from the photodetector to produce the electrical signal.

It is thus a feature of at least one embodiment of the invention to permit amplitude measurement with a single photodetector by timeshifting the frequency offsets and through the use of precision demodulator circuits.

The demodulator may be phase locked to the optical switch.

It is thus a feature of at least one embodiment of the invention to preserve sign information in the differentiation process to permit accurate reconstruction of the spectral shape.

The optical switch may be a light gate applying identical pulses of output light to the first and second light paths.

It is thus a feature of at least one embodiment of the invention to permit the use of a simple mechanical or electrical chopper for generating the pulses.

Alternatively, the optical switch may be a diverter alternating the application of light pulses to the first and second light paths, for example a Mach-Zehnder interferometer.

It is thus a feature of at least one embodiment of the invention to provide a simple high-speed pulse generating system with no moving parts.

In an alternative embodiment, the present invention may provide an absorption spectrometer using a multi-frequency light source producing a substantially constant spectrum of multiple simultaneous light frequencies over the range of an absorption spectrum, again without dithering. In this embodiment, a spectroscope receives light from the multi-frequency light source after passage through the test cell to produce a spectrum and the analyzer processes the spectrum to produce an electrical signal being substantially a differencing or differentiation of intensity values of the output light at different adjacent spectral frequencies over successive spectral frequencies. The processed spectrum is then received by the reconstructor to reconstruct the absorption spectrum of the material.

It is thus a feature of at least one embodiment of the invention to provide an extremely high-speed system that may process multiple frequencies simultaneously.

These particular objects and advantages may apply to only some embodiments falling within the claims and thus do not define the scope of the invention.

DETAILED DESCRIPTION OF THE PREFERRED EMBODIMENT

Figure 1:
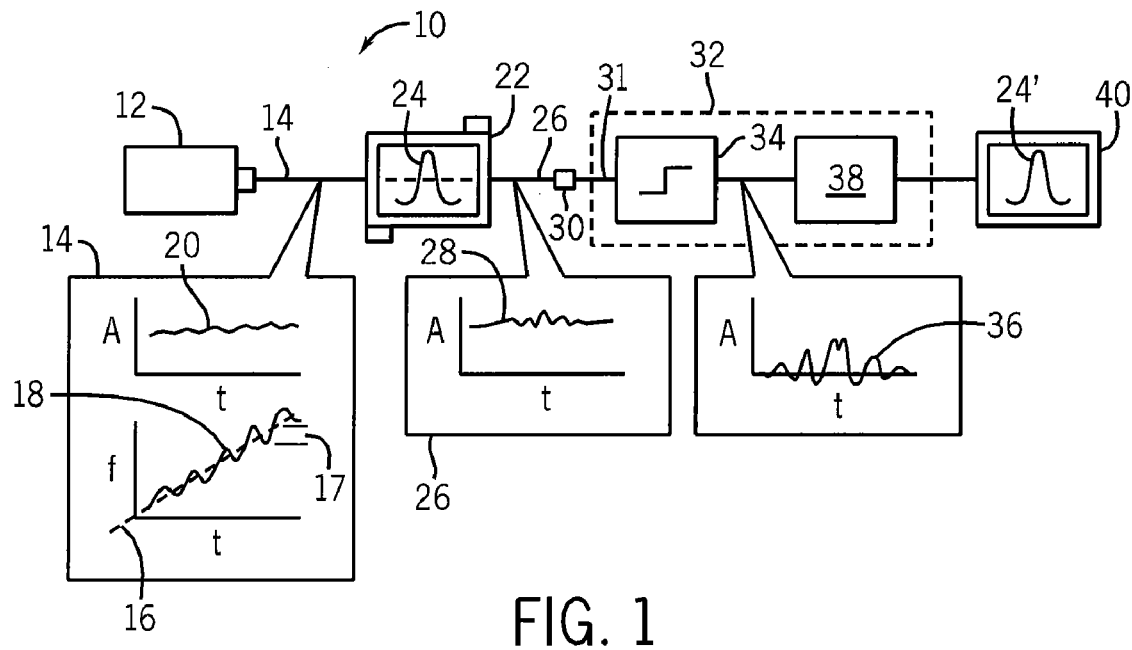
FIG. 1 is a block diagram of a prior art frequency modulated spectrometer using a frequency-swept light source with frequency dithering such as produces some unwanted amplitude modulation.

Referring to FIG. 1, a prior art wavelength or frequency modulated absorption spectrometer 10 may provide a light source 12, such as a laser, outputting a monochromatic light 14 that may be swept monotonically in frequency over time as indicated by dotted line 16 to provide a general trend of, for example, increasing frequency with time. The light 14 may also be "dithered" with small frequency excursions to produce a frequency-swept and dithered modulation pattern 18. During this frequency modulation, the amplitude 20 of the light (its intensity) is desirably substantially constant but in practice has small amplitude modulations caused by the dithering.

The output light 14 is received by a test cell 22 which should be understood herein to include a standard laboratory test cell 22 but also effective test cells such as a specially fitted combustion chamber or the like as well as environmentally open volumes used in atmospheric study. Material within the test cell 22 may have one or more characteristic absorption transitions 24 represented diagrammatically.

Light 26 output from the test cell 22 will have a modulated amplitude 28 caused by the interaction of the dithered frequency of the light 14 and the absorption peak 24. The modulated amplitude 28 of light 26 may be measured by a photodetector 30 to produce signal 31 being generally the electrical equivalent of modulated amplitude 28.

Generally the signal 31 will be offset above zero by the intensity of the light 14 passing through the test cell 22 to be received by the photodetector 30. This intensity, termed "background radiation", limits the amount of amplification of the signal detected by the photodetector 30 without saturation of a downstream amplifier or other device.

Accordingly, the signal 31 may be communicated to an analyzer 32 which may be a high pass filter/amplifier 34 or its equivalent removing any constant term of the modulated amplitude 28 thereby essentially eliminating the background radiation to produce an amplified substantially offset-free amplitude modulated signal 36 approximately centered about zero voltage to be compatible with further amplification.

A demodulator 38 may receive the offset-free amplitude modulated signal 36, for example, using a phase-locked demodulation linked to the frequency and phase of the dithering 17 to reconstruct the absorption peak 24 and display the same on a display 40 according to techniques generally understood in the art. The process of modulation thus allows the component of the light signal related to the absorption peak 24 to be separated from the background radiation to provide better amplification of the absorption component.

As discussed above, a drawback to this approach is that typically the mechanisms for producing the dithering 17 (for example, modulating a signal driving a tunable diode laser) also impose a slight amplitude modulation on amplitude 20 of the light 14. This modulation passes through the high pass filter/amplifier 34 and thus competes with and corrupts the amplitude modulated signal 36 used to produce the absorption peak 24 ultimately distorting the reconstruction of the absorption spectrum 24'.

Figure 2:
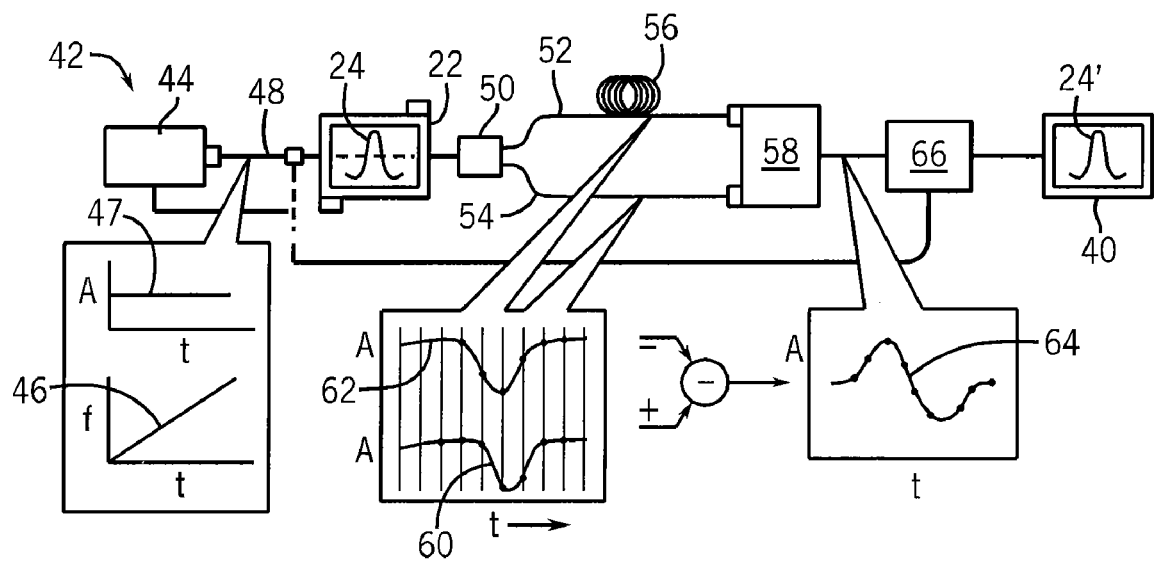
FIG. 2 is a block diagram similar to FIG. 1 showing a first embodiment of the present invention employing a frequency-swept light source without dithering and using a beam splitter/delay line position after the test cell.

Referring now to FIG. 2, an absorption spectrometer 42 of the first embodiment of the present invention employs a light source 44 providing for a swept frequency 46 without dithering and with substantially constant or slowly varying amplitude 47. Significantly the light source 44 avoids the amplitude modulation associated with dithering.

Generally, the swept frequency 46 of light 48 from the light source 44 moves monotonically from a low to a high frequency or vice versa spanning the desired range of the absorption peaks 24. Monotonically, as used herein, means that successive frequencies of the light 14 either consistently increase or decrease but not both as measured in the range of the spectrum.

Light 48 from the light source 44 passes through test cell 22 and is received by a beam splitter 50 which separates the beam into a first optical fiber providing first light path 52 and a second optical fiber providing second light path 54. First light path 52 includes a delay line 56 (for example a coil of fiber). Light exiting the first fiber will therefore show an absorption feature 60 that is delayed with respect to the absorption feature 62 exiting the second fiber. Otherwise absorption features 60 and 62 are essentially identical.

Light from the first light path 52 and second light path 54 are then received by different ports of a balanced photodetector 58 which subtracts the intensity or amplitude of the two signals to produce a differentiated signal 64 being a point-by-point difference between features 62 and 60 as a function of time. As a result of the delay line 56, the differentiated signal 64 may be understood to be a time-derivative of the light signal received by the beam splitter 50.

The differentiated signal 64 may simply be integrated, for example by analyzer 66, to produce an output of an absorption spectrum 24' in display 40. Analyzer 66 may also receive a signal from the light source 44 indicating the frequency function of the light for calibration purposes (e.g. assigning specific frequencies to the absorption spectrum 24') and/or correcting for nonlinearities in the sweeping process. Alternatively this calibration signal may be derived from measurement of the actual produced light 48.

Figure 3:
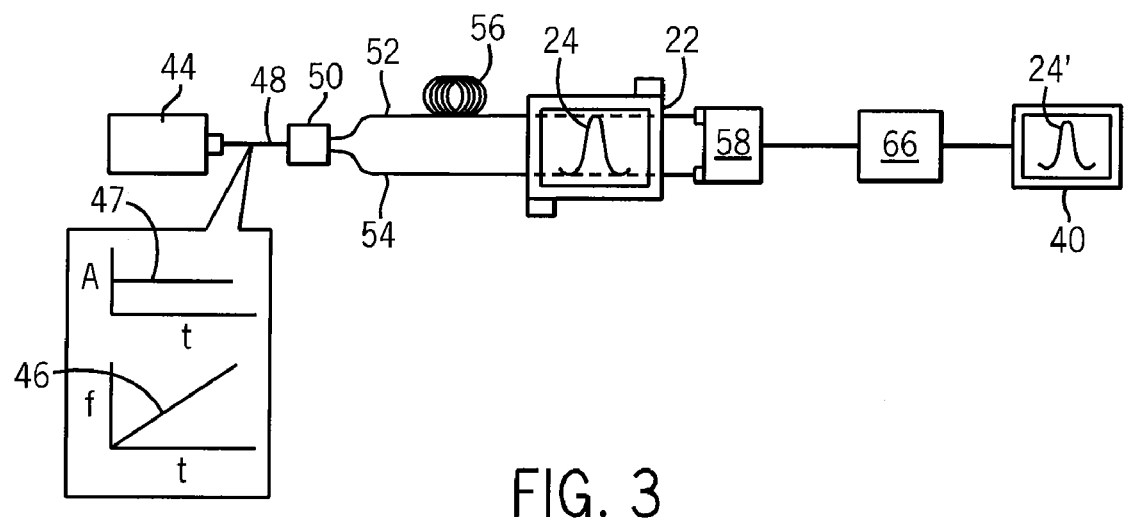
FIG. 3 is a block diagram similar to that of FIG. 2, showing an embodiment with the beam splitter/delay line positioned before the test cell.

Referring now to FIG. 3, in an alternative embodiment which provides simpler collimation optics, the beam splitter 50 may receive light 48 directly from the light source 44 to provide light along the first light path 52 and second light path 54 communicating directly with the test cell 22. Separate light paths through the test cell 22 may be maintained to the two input ports of the balanced photodetector 58, the latter which may communicate with analyzer 66 to process the absorption spectrum 24' as previously described.

Figure 4:
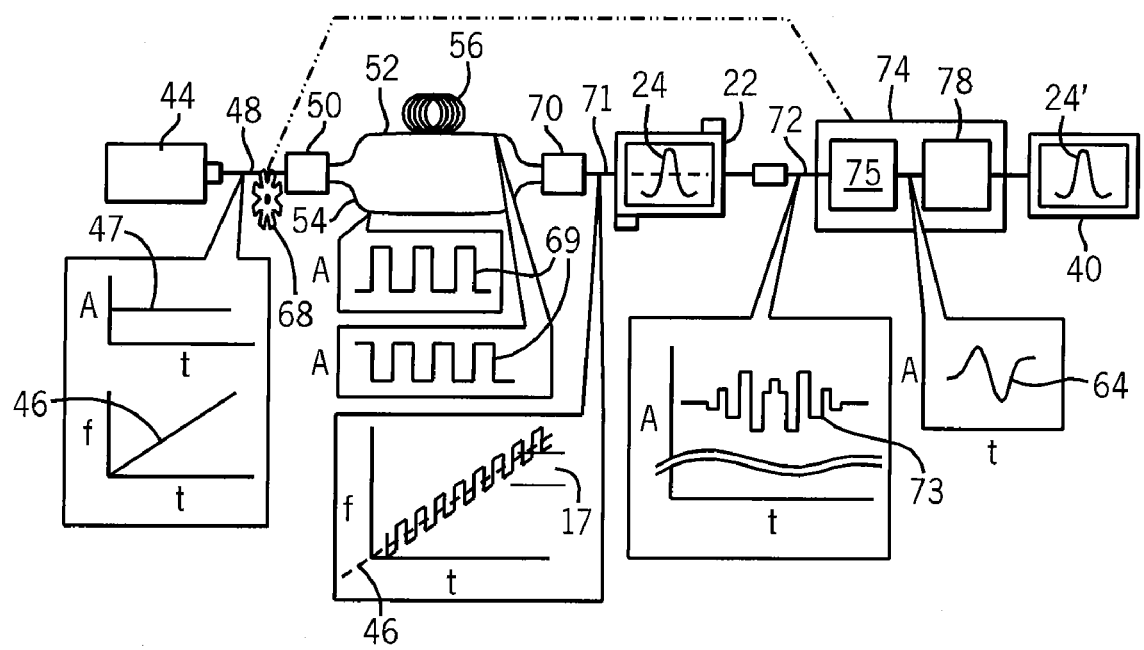
FIG. 4 is a block diagram of an alternative embodiment of the invention employing a chopper and a beam splitter/delay line to create an effective dithered signal without dithering of the light source.

Referring now to FIG. 4, in an alternative embodiment, the light source 44 may produce light 48, similar to that described above, that is received by a chopper 68 shown here as a mechanical rotating vane that converts the light into a series of pulses, preferably having a 50% duty cycle. It will be understood that the chopper 68 could also be an electro-optical switch such as a Kerr cell or the like. The pulses produced by the chopper 68 are received by beam splitter 50 passing the pulses to both the first light path 52 and second light path 54. The output of these light paths 52 and 54 will provide a set of pulses 69 that can be interleaved by proper selection of the delay of delay line 56 to equal the pulse "on time" defined by the chopper 68. As so interleaved, the pulses 69 from the first light path 52 and second light path 54 may be recombined by an optical combiner 70 to produce a light 71 that shows an overall monotonic frequency sweeping per the light 48 with an effective frequency-dithering 17 imposed by the delay line 56 in light path 54 which introduces a time discontinuity between pulses 69.

The dithered light 71 may be passed to the test cell 22 and be received by the photodetector 72 to provide a modulated amplitude light signal 73 similar to amplitude modulated signal 36 described above in the prior art albeit in a discretized form.

Amplitude modulation in light signal 73 imposed on dithered light 71 after passage through the test cell 22 may be demodulated by analyzer 74 using a phase locked demodulator 75 receiving phase information from the chopper 68 to provide a difference signal 64 being generally the derivative of the spectral peak 24. This difference signal 64 may be processed, for example, by integrator 78 to produce an absorption spectrum 24'.

Figure 5:
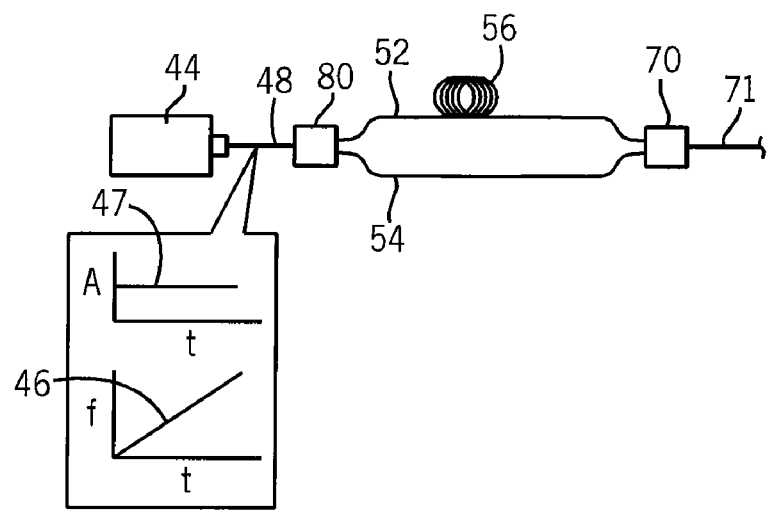
FIG. 5 is a fragmentary block diagram similar to that of FIG. 4 showing an embodiment replacing the chopper of FIG. 4 with a Mach-Zehnder interferometer.

Referring now to FIG. 5, the action of the chopper 68 which simultaneously applies pulses to both the first light path 52 and second light path 54 may be replaced by a Mach-Zehnder interferometer 80 having to output ports to which the light 48 is alternately directed according to its frequency. In one embodiment, the Mach-Zehnder interferometer 80 may have one port connected to splitter 50 of FIG. 4 to serve in lieu of chopper 68, albeit without moving parts.

Alternatively, as shown, the Mach-Zehnder interferometer 80 may apply alternate pulses to a first light path 52 and second light path 54. Delay line 56, in this case, may be adjusted to delay light through the first light path 52 by a full cycle of the pulsing to produce interleaved, time discontinuous pulses at the output of combiner 70. As described above, this dithered light 71 will be both frequency-swept and dithered. The analysis of the dithered light 71 may be otherwise identical to the description of FIG. 4.

Figure 6:
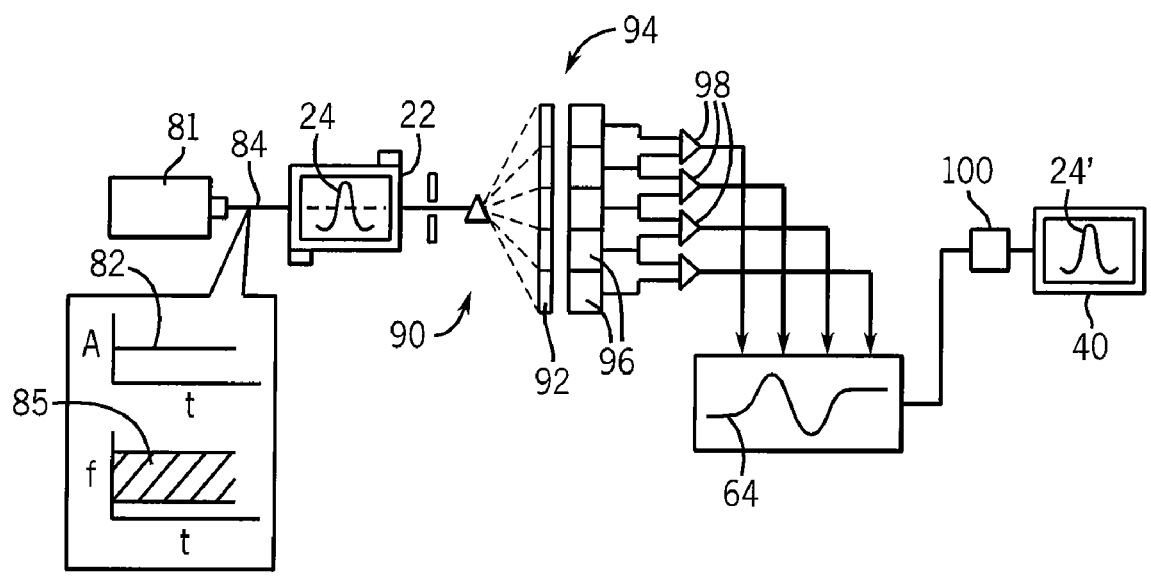
FIG. 6 is a figure of an alternative embodiment using a polychromatic (un-swept) light source and a slit spectrometer to provide a virtual dithering by pairwise differencing of adjacent sections of the produced spectrum.

Referring now to FIG. 6, in an alternative embodiment a light source 81 may provide for a polychromatic light 84 having a constant amplitude 82 and multiple simultaneous frequencies in a frequency band 85. The light 84 may be received by the test cell 22 and, exiting the test cell 22, received by a spectrometer 90 shown here as a split spectrometer using a prism, this depiction intended to symbolically represent any spectrometer that produces a classic optical spectrum 92 in which various light components are spatially separated along a least one axis, for example by a grating or other optical technique. The spectrum 92 may be read by a CCD camera 94 having different pixel detectors 96 associated with different frequencies of the spectrum 92. Each pixel detector 96 thus detects light in a different spectral segment of the spectrum 92.

Signals from pairwise adjacent pixel detectors 96 are subtracted one from another by means of summing junctions 98, for example operation amplifiers configured as subtractors, each producing a different point in an equivalent of signal 64 being a derivative of the absorption spectrum 24'. The signal 64 may be processed by analyzer 100 to produce the absorption spectrum 24' according the techniques described above with respect to FIG. 1.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An absorption spectrometer comprising:
   a test cell for holding a material for spectrographic analysis;
   a multi-frequency light source producing a monotonically swept frequency spanning a frequency range of an absorption spectrum;
   a splitter/delay system splitting light from the multi-frequency light source into a first and second path wherein the light is delayed in the first path with respect to the second path;
   an analyzer receiving output light from the multi-frequency light source after passage through both the test cell and the first and second path to provide an electrical signal substantially reducing a measure of background radiation from the multi-frequency light source unattenuated by the material; and
   a reconstructor receiving the electrical signal to reconstruct the absorption spectrum of the material.

2. The absorption spectrometer of claim 1 wherein the provided electrical signal is substantially a differentiation of intensity values of the output light at different adjacent spectral frequencies over successive spectral frequencies.

3. The absorption spectrometer of claim 1 further including an output display providing a display of information derived from the absorption spectrum.

4. The absorption spectrometer of claim 1 wherein the analyzer includes a balanced photodetector receiving light from the first and second light path at different ports of the balanced photodetector, the balanced photodetector taking a difference of the light at the different ports to produce the electrical signal.

5. The absorption spectrometer of claim 1 wherein the first light path includes a delay element before the test cell.

6. The absorption spectrometer of claim 1 wherein the first light path includes a delay element after the test cell.

7. The absorption spectrometer of claim 1 wherein the analyzer includes a photodetector and further includes an optical switch applying pulses of the light from a multi-frequency light source to the first and second light path so that light from the multi-frequency light source is received at a single photodetector after two different delay times providing at alternating times light at different adjacent spectral frequencies;
wherein the analyzer further includes a demodulator receiving the electrical signal from the photodetector to produce the electrical signal.

8. The absorption spectrometer of claim 7 wherein the demodulator is phase locked to the optical switch.

9. The absorption spectrometer of claim 7 wherein the optical switch is a light gate applying identical pulses of output light to the first and second light paths.

10. The absorption spectrometer of claim 7 wherein the optical switch is a diverter alternating an application of light pulses to the first and second light paths.

11. The absorption spectrometer of claim 7 wherein the optical switch is a Mach-Zehnder interferometer.

12. An absorption spectrometer comprising:
a test cell for holding a material for spectrographic analysis;
a multi-frequency light source producing a substantially constant spectrum of multiple simultaneous light frequencies over a range of an absorption spectrum;
a spectroscope receiving light from the multi-frequency light source after passage through the test cell to produce an optical spectrum; and
an analyzer receiving the spectrum to produce an electrical signal being substantially a differentiation of intensity values of light output from the material at different adjacent spectral frequencies over successive spectral frequencies; and
a reconstructor receiving the electrical signal to reconstruct the absorption spectrum of the material.

13. The absorption spectrometer of claim 12 wherein the spectroscope employs a camera and the analyzer samples the optical spectrum by selection of different pixels of the camera image.

14. The absorption spectrometer of claim 12 further including an output display providing a display of information derived from the absorption spectrum.

15. A method of absorption spectroscopy comprising the steps of
(1) applying a frequency variable light to a material for spectrographic analysis, the frequency variable light producing a monotonically swept frequency spanning a frequency range of an absorption spectrum;
(2) splitting light of the frequency variable light into a first and second path wherein the light is delayed in the first path with respect to the second path;
(3) analyzing light of the frequency variable light after passage through both the material and the first and second path to provide a signal being a function of variations in intensity values of light output from the material at different adjacent spectral frequencies over successive spectral frequencies; and
(4) reconstructing an absorption spectrum from the signal.

16. The method of claim 15 wherein the analyzing takes a difference of the light intensity at given times between the first and second light path.

17. The method of claim 15 including the step of applying pulses of the frequency variable light to the first and second light path so that pulses of the frequency variable light in the first and second light paths are received for analysis after two different delay times providing at given times intensities for different adjacent spectral frequencies; and
wherein the analyzing demodulates combined light from the first and second paths to produce the signal.

18. The method of claim 17 wherein the pulses are produced using a Mach-Zehnder interferometer.

19. A method of absorption spectroscopy comprising the steps of:
(1) applying a multi-frequency light source to a material for spectrographic analysis, the multi-frequency light source producing a substantially constant spectrum of multiple simultaneous light frequencies over a range of an absorption spectrum;
(2) generating at least one spectrum of the multi-frequency light source after passage through the material; and
(3) analyzing light from the multi-frequency light source after passage through the material to provide a signal being a function of variations in intensity values of light output from the material at different adjacent spectral frequencies of the spectrum over successive spectral frequencies; and
(4) reconstructing an absorption spectrum from the signal.

20. The method of claim 19 wherein a camera captures the spectrum and the analyzing samples the spectrum by selection of different pixels of the camera image.

* * * * *